(12) United States Patent
Won et al.

(10) Patent No.: US 10,352,441 B2
(45) Date of Patent: Jul. 16, 2019

(54) METHOD FOR CONTROLLING GEAR RATIO OF CONTINUOUSLY VARIABLE TRANSMISSION VEHICLE

(71) Applicants: Hyundai Motor Company, Seoul (KR); KIA Motors Corporation, Seoul (KR)

(72) Inventors: Chan Hee Won, Seoul (KR); Hyung Hee Lee, Yongin-si (KR); Woo Il Chang, Hwaseong-si (KR); Jun Sung Park, Yongin-si (KR); Ho Young Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 105 days.

(21) Appl. No.: 15/815,052

(22) Filed: Nov. 16, 2017

(65) Prior Publication Data

US 2018/0372218 A1 Dec. 27, 2018

(30) Foreign Application Priority Data

Jun. 26, 2017 (KR) .................. 10-2017-0080414

(51) Int. Cl.
*F16H 61/66* (2006.01)
*F16H 9/16* (2006.01)
(Continued)

(52) U.S. Cl.
CPC .............. *F16H 61/66* (2013.01); *F16H 9/16* (2013.01); *F16H 61/427* (2013.01);
(Continued)

(58) Field of Classification Search
CPC .................. F16H 61/66; F16H 61/662; F16H 2061/6615; F16H 2061/6616; F16H 2061/6617
See application file for complete search history.

(56) References Cited

U.S. PATENT DOCUMENTS 5,924,955 A * 7/1999 Ishii .................. F16H 61/66259
477/48
5,947,861 A 9/1999 Nobumoto
(Continued)

FOREIGN PATENT DOCUMENTS

JP 09203460 A * 8/1997
JP H09-303538 A 11/1997
(Continued)

OTHER PUBLICATIONS

Korean Office Action dated Dec. 23, 2018 from the Korean Application No. 10-2017-0124891, 16 pp.
(Continued)

*Primary Examiner* — David R Morris
(74) *Attorney, Agent, or Firm* — Brinks Gilson & Lione

(57) ABSTRACT

A method for controlling a gear ratio of a continuously variable transmission vehicle includes: a step of detecting a position of a shift lever by a controller; a step of checking, by the controller, a gear ratio variation based on a difference between a desired stage gear ratio and a current gear ratio in a continuously variable transmission when the shift lever is detected to be positioned in a manual range; a step of calculating, by the controller, a gear ratio correction value based on a rate of change of engine RPM when the gear ratio variation is checked as being other than zero after the step of checking the gear ratio variation; and a step of correcting, by the controller, the gear ratio variation in response to the calculated gear ratio correction value after the calculation step.

6 Claims, 4 Drawing Sheets

(51) Int. Cl.
*F16H 61/427* (2010.01)
*F16H 61/462* (2010.01)

(52) U.S. Cl.
CPC ... *F16H 61/462* (2013.01); *F16H 2061/6603* (2013.01); *F16H 2061/6615* (2013.01); *F16H 2061/6616* (2013.01); *F16H 2061/6617* (2013.01)

(56) References Cited

U.S. PATENT DOCUMENTS

| | | |
|---|---|---|
| 2009/0171542 A1 | 7/2009 | Sugiura et al. |
| 2012/0143451 A1 | 6/2012 | Nishida et al. |
| 2015/0198240 A1 | 7/2015 | Ajimoto |

FOREIGN PATENT DOCUMENTS

| | | |
|---|---|---|
| JP | 3637712 | 4/2005 |
| JP | 2005-315320 | 11/2005 |
| JP | 3716704 | 11/2005 |
| KR | 10-0747037 | 8/2007 |
| KR | 10-2015-0086453 | 7/2015 |

OTHER PUBLICATIONS

United States Notice of Allowance dated Jan. 3, 2019 from U.S. Appl. No. 15/826,466, 12 pp.

* cited by examiner

METHOD FOR CONTROLLING GEAR RATIO OF CONTINUOUSLY VARIABLE TRANSMISSION VEHICLE

CROSS REFERENCE TO RELATED APPLICATION

The present application claims priority to and the benefit of Korean Patent Application No. 10-2017-0080414, filed on Jun. 26, 2017, which is incorporated herein by reference in its entirety.

FIELD

The present disclosure relates to a method for controlling a gear ratio of a continuously variable transmission vehicle, which provides a driver with a uniform shift quality for each shift stage.

BACKGROUND

The statements in this section merely provide background information related to the present disclosure and may not constitute prior art.

An improvement in fuel efficiency and an enhancement in eco friendliness are critical items in developing a vehicle, and in order to achieve this goal, a continuously variable transmission (CVT) has been increasingly applied to the vehicle.

The CVT means a transmission that uses belts or planetary gear sets instead of existing gears to obtain a continuous gear ratio. A typical transmission has a fixed gear ratio and adjusts the gear ratio as demanded, whereas the CVT continuously changes a gear ratio within a fixed range.

In the CVT, gear shifting is performed only by the operation of an accelerator pedal, and it is therefore possible to exhibit an excellent riding quality and improve fuel efficiency or acceleration performance.

The CVT is, of course, advantageous in terms of fuel efficiency or power performance since it may freely control a gear ratio within a fixed range. However, since the CVT decreases a responsiveness of engine RPM, some drivers feel stuffy or bored.

Accordingly, studies for controlling a gear ratio of a CVT in various manners are ongoing in order to provide driving fun and improve drivability for a driver even in a vehicle using the CVT.

The foregoing is intended merely to aid in the understanding of the background of the present disclosure, and is not intended to mean that the present disclosure falls within the purview of the related art that is already known to those skilled in the art.

SUMMARY

The present disclosure proposes a method for controlling a gear ratio of a continuously variable transmission vehicle, to which a manual driving mode is applied to improve drivability of a vehicle equipped with a continuously variable transmission, and which provides a driver with a uniform shift quality for each shift stage as much as possible while inhibiting disharmonic shifting negatively affecting the driver's shift feelings when shifting is performed by a tip operation in the manual driving mode.

In accordance with one aspect of the present disclosure, a method for controlling a gear ratio of a continuously variable transmission vehicle includes: detecting a position of a shift lever by a controller; checking, by the controller, a gear ratio variation based on a difference between a desired stage gear ratio and a current gear ratio in a continuously variable transmission when the shift lever is detected to be positioned in a manual range; calculating, by the controller, a gear ratio correction value based on a rate of change of engine RPM when the gear ratio variation is checked as being other than zero ("0"), after the checking a gear ratio variation; and correcting, by the controller, the gear ratio variation in response to the calculated gear ratio correction value, after the calculating a gear ratio correction value.

In the calculating a gear ratio correction value, the controller may calculate the gear ratio correction value in proportion to the rate of change of engine RPM.

In the correcting the gear ratio variation, the controller may perform correction only when the checked gear ratio variation is greater than "0" and the gear ratio correction valve is smaller than "0".

In the correcting the gear ratio variation, the controller may perform correction only when the checked gear ratio variation is smaller than "0" and the gear ratio correction valve is greater than "0".

In the checking a gear ratio variation, the controller may check the gear ratio variation only when the desired stage gear ratio is not a minimum or maximum stage gear ratio.

The controller may set the gear ratio variation at "0" when the desired stage gear ratio is a minimum or maximum stage gear ratio, and the controller may determines the current gear ratio as the desired stage gear ratio.

As apparent from the above description, in accordance with the method for controlling a gear ratio of a continuously variable transmission vehicle having the above-mentioned structure, when the mode of the vehicle equipped with the continuously variable transmission is switched to the manual driving mode, the manual shifting is performed by continuously applying the gear ratio variation depending on the difference between the desired stage gear ratio and the current gear ratio. Therefore, it is possible to inhibit the occurrence of disharmonic shifting.

In addition, the gear ratio variation is controlled to be reduced according to the rate of change of engine RPM. Therefore, it is possible to secure the consistent amount of pulley shift during gear shifting in the manual mode and to improve vehicle performance and efficiency by setting the desired ratio to be close to a desired stage gear ratio.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
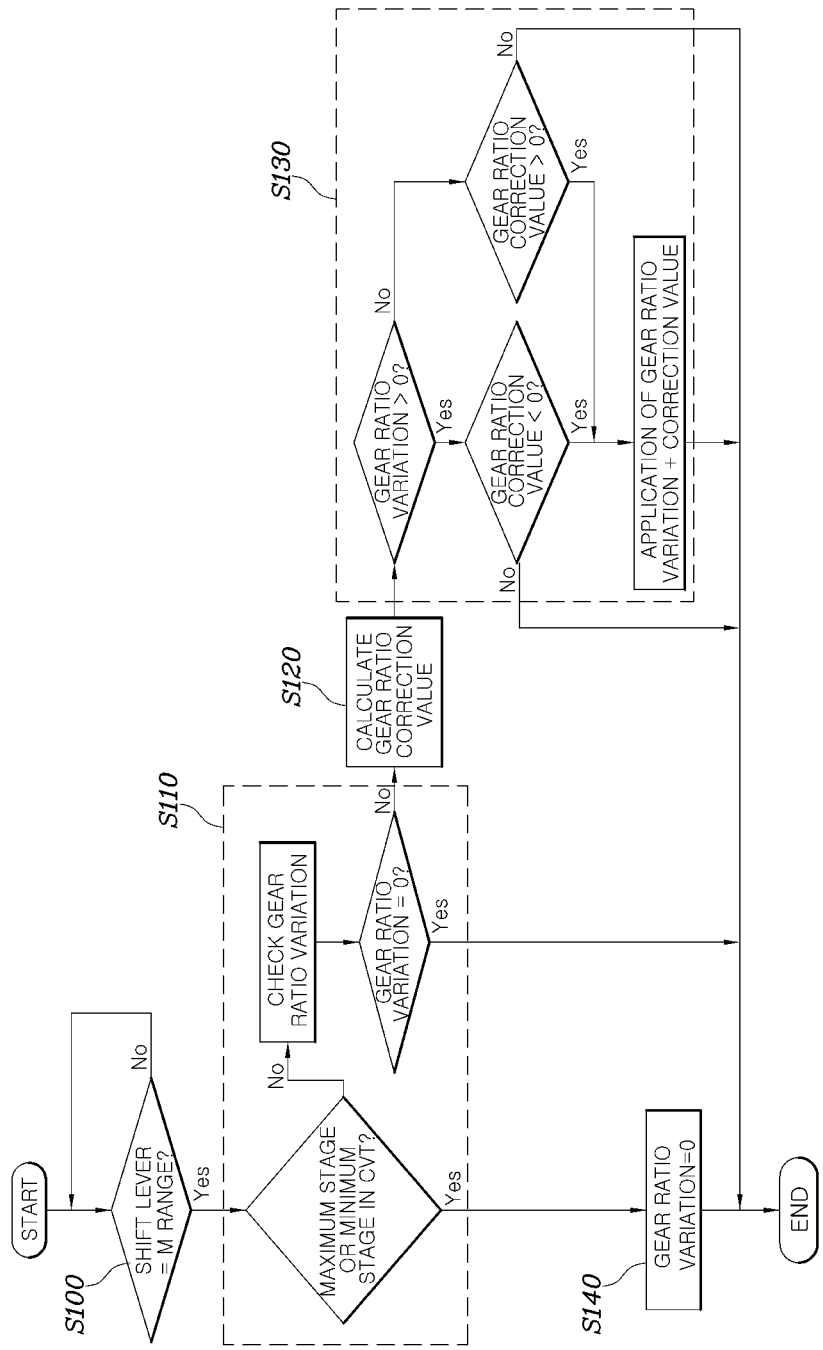
FIG. 1 is a flowchart illustrating a method for controlling a gear ratio of a continuously variable transmission vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
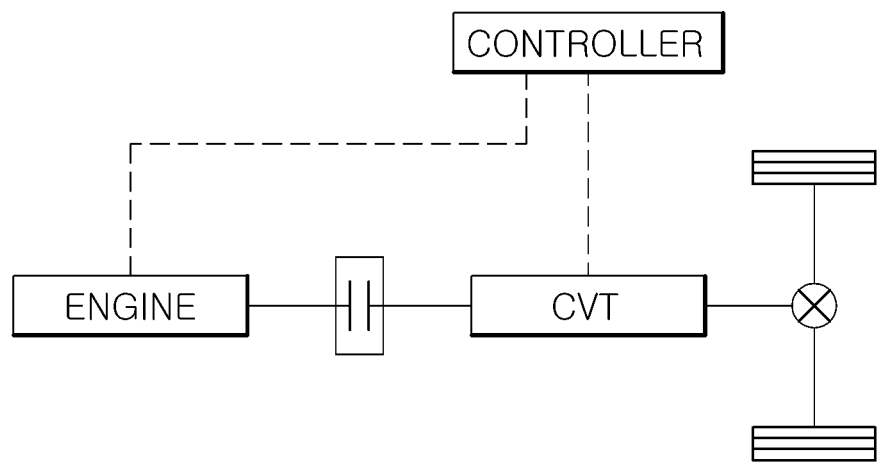
FIG. 2 is a diagram schematically illustrating a continuously variable transmission vehicle in one form of the present disclosure.

FIG. 1 is a flowchart illustrating a method for controlling a gear ratio of a continuously variable transmission vehicle in one form of the present disclosure. FIG. 2 is a diagram schematically illustrating a continuously variable transmission vehicle in one form of the present disclosure.

Referring to FIGS. 1 and 2, the method for controlling a gear ratio of a continuously variable transmission vehicle may include: a step of detecting a position of a shift lever (S100) by a controller, a step of checking a gear ratio variation (S110) depending on a difference between a desired stage gear ratio and a current gear ratio in a continuously variable transmission by the controller when the shift lever is detected as being positioned in a manual range in the detection step (S100), a step of calculating a gear ratio correction value (S120) based on the rate of change of engine RPM by the controller when the gear ratio variation is checked as not zero (i.e., "0") after the check step (S110), and a step of correcting the gear ratio variation (S130) in response to the calculated gear ratio correction value by the controller after the calculation step (S120).

As illustrated in FIG. 2, the present disclosure relates to a vehicle equipped with a continuously variable transmission between an engine and a differential gear, and a controller of the vehicle may control the gear ratio of the continuously variable transmission by communicating with the engine and the continuously variable transmission (e.g., transmitting and receiving control signals each other). Although the controller may be a single control unit, it may consist of a plurality of control units for transmitting and receiving control signals to and from the respective engine and continuously variable transmission.

Referring to FIG. 1 again, in the form of the present disclosure, the controller first determines whether a manual driving mode is executed by detecting a driver's shift lever operation (S100).

If the driver moves the shift lever to a manual range, the controller determines that the manual driving mode is executed and defines the current pulley gear ratio of the continuously variable transmission as a current gear ratio. Next, the controller sets a desired stage gear ratio from a gear ratio region which covers the defined current gear ratio, and calculates a gear ratio variation based on the difference between the desired stage gear ratio and the current gear ratio.

The gear shifting is performed while the calculated gear ratio variation is maintained when the driver operates a shift lever tip. Therefore, it is possible to uniformly maintain an amount of shift in the pulley gear ratio and to secure consistent shifting.

Figure 3:
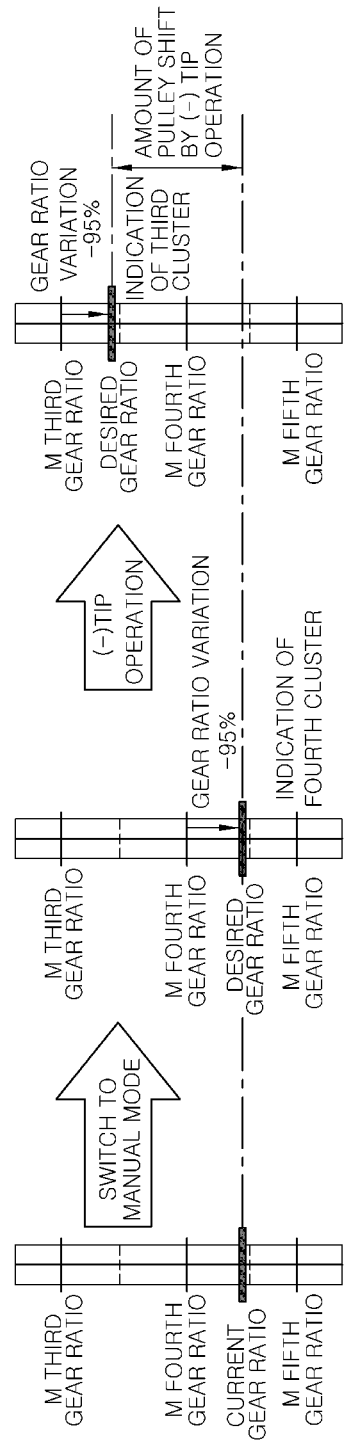
FIGS. 3 and 4 are views schematically illustrating a method of application of a gear ratio variation in one form of the present disclosure.
Figure 4:
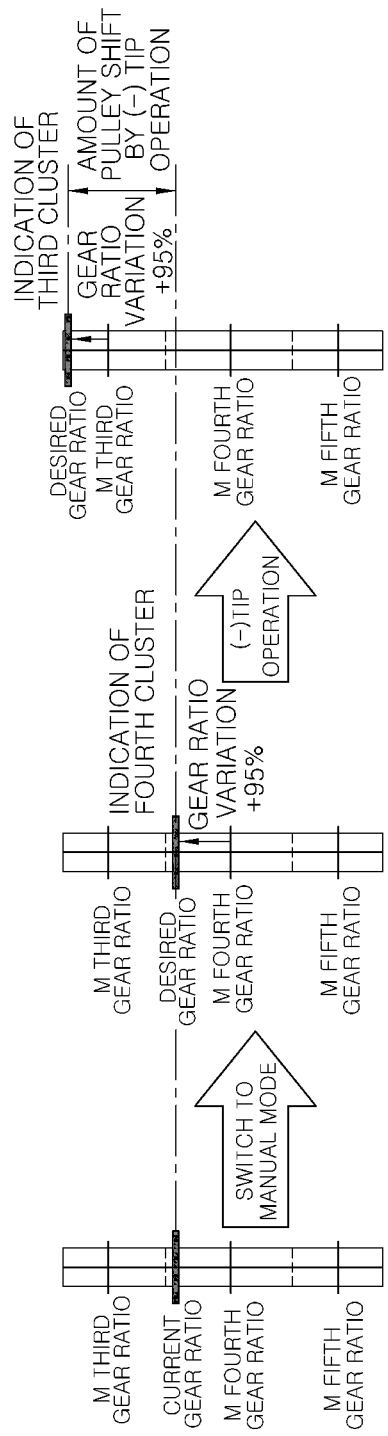

FIGS. 3 and 4 are views schematically illustrating a method of application of a gear ratio variation according to one form of the present disclosure.

Referring to FIG. 3, in a case where a vehicle travels in a typical driving mode (i.e., a gear ratio is continuously changed by a continuously variable transmission), and later the typical driving mode is switched to a manual driving mode by a driver, a gear ratio variation is calculated based on the difference between a current gear ratio (i.e., a pulley gear ratio) at that time and a fourth gear ratio (i.e., a desired stage gear ratio). Here, the desired stage gear ratio may be set as a preset multistage gear ratio closest to the current gear ratio.

In FIG. 3, the gear ratio variation is calculated as being −95%, in which case, when the driver performs a fourth-to-third down shift by a tip operation, the gear ratio variation (i.e., −95%) is applied. Accordingly, it is possible to perform gear shifting by setting the gear ratio, which is obtained by applying the gear ratio variation of −95% to the third gear ratio as a desired stage gear ratio, as a desired gear ratio.

On the other hand, referring to FIG. 4, the gear ratio variation is calculated to be 95%, in which case, when the driver performs a fourth-to-third down shift by a tip operation, the gear ratio variation is applied as it is. Accordingly, it is possible to perform gear shifting by setting the gear ratio, which is obtained by applying the gear ratio variation of 95% to the third gear ratio as a desired stage gear ratio, as a desired gear ratio.

Accordingly, an amount of pulley shift is uniformly maintained when the driver manipulates a tip to perform a gear shift by the shift lever in the manual driving mode, thereby enabling the driver to feel a uniform shift quality.

Meanwhile, when the gear ratio variation is determined as being other than zero "0", the controller calculates a gear ratio correction value based on the rate of change of engine RPM in S120, and additionally corrects the gear ratio variation based on the calculated gear ratio correction value in S130.

That is, if the gear ratio variation is continuously maintained, the gear ratio of the continuously variable transmission may not reach a desired gear ratio intended by a designer. Therefore, the present disclosure allows the gear ratio variation to be naturally removed by the gear ratio correction value according to the rate of change of engine RPM, thereby enabling the manual shifting to be performed at a desired gear ratio set by the designer.

Specifically, in the calculation step (S120), the controller may calculate a gear ratio correction value in proportion to the rate of change of engine RPM.

Here, in case of increasing the engine RPM in the manual driving mode, the gear ratio correction value may be calculated to increase the gear ratio variation. On the other hand, in case of decreasing the engine RPM, the gear ratio correction value may be calculated to decrease the gear ratio variation.

Accordingly, since the gear ratio correction value is calculated such that the gear ratio variation is gradually removed according to the rate of change of engine RPM, it is possible to reduce an occurrence of disharmonic shifting and remove the gear ratio variation.

In this case, in the correction step (S130), when the checked gear ratio variation is greater than "0", the controller may perform correction only when the gear ratio correction valve is smaller than "0".

In addition, in the correction step (S130), when the checked gear ratio variation is smaller than "0", the controller may perform correction only when the gear ratio correction valve is greater than "0".

That is, since there is no need to increase the gear ratio variation when the gear ratio variation is greater than "0", the correction is performed only when the gear ratio correction valve is smaller than "0". In addition, since there is no need to decrease the gear ratio variation when the gear ratio variation is smaller than "0", the correction for adding the gear ratio correction value to the gear ratio is performed only when the gear ratio correction valve is greater than "0".

Meanwhile, in the check step (S110), the controller may check the gear ratio variation only when the desired stage gear ratio is not a minimum or maximum stage gear ratio.

In step S140, the controller checks that the gear ratio variation is "0" when the desired stage gear ratio is a minimum or maximum stage gear ratio, and then may control the current gear ratio as a desired stage gear ratio. This is because when the desired shifting stage is a minimum stage, there is no a gear ratio less than the minimum state, and when the desired shifting stage is a maximum stage, a gear ratio greater than the maximum stage cannot be formed.

Accordingly, when the desired stage gear ratio is set as a minimum or maximum stage gear ratio by the tip operation in the case where the vehicle travels in the manual driving mode by the driver, it is possible to form the minimum or maximum stage gear ratio by forcibly setting the gear ratio variation at "0".

In this case, since the gear ratio variation is naturally removed, it is possible to form a desired stage gear ratio as intended by the designer.

In accordance with the method for controlling a gear ratio of a continuously variable transmission vehicle having the above-mentioned structure, when the mode of the vehicle equipped with the continuously variable transmission is switched to the manual driving mode, the manual shifting is performed by continuously applying the gear ratio variation depending on the difference between the desired stage gear ratio and the current gear ratio. Therefore, it is possible to reduce the occurrence of disharmonic shifting.

In addition, the gear ratio variation is controlled to be reduced according to the rate of change of engine RPM. Therefore, it is possible to secure the consistent amount of pulley shift during gear shifting in the manual mode and to improve vehicle performance and efficiency by setting the desired ratio to be close to a desired stage gear ratio.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A method for controlling a gear ratio of a continuously variable transmission vehicle, the method comprising:
    detecting a position of a shift lever by a controller;
    checking, by the controller, a gear ratio variation based on a difference between a desired stage gear ratio and a current gear ratio in a continuously variable transmission when the shift lever is detected to be positioned in a manual range;
    calculating, by the controller, a gear ratio correction value based on a rate of change of engine revolutions per minute (RPM) when the gear ratio variation is checked as being other than zero ("0"), after the checking the gear ratio variation; and
    correcting, by the controller, the gear ratio variation in response to the calculated gear ratio correction value, after the calculating the gear ratio correction value.

2. The method according to claim 1, wherein, in the calculating the gear ratio correction value, the controller calculates the gear ratio correction value in proportion to the rate of change of engine RPM.

3. The method according to claim 1, wherein, in the correcting the gear ratio variation, when the checked gear ratio variation is greater than "0", the controller performs correction only when the gear ratio correction value is smaller than "0".

4. The method according to claim 1, wherein, in the correcting the gear ratio variation, when the checked gear ratio variation is smaller than "0", the controller performs correction only when the gear ratio correction value is greater than "0".

5. The method according to claim 1, wherein, in the checking the gear ratio variation, the controller checks the gear ratio variation only when the desired stage gear ratio is not a minimum or maximum stage gear ratio.

6. The method according to claim 1, wherein the controller sets the gear ratio variation at "0" when the desired stage gear ratio is a minimum or maximum stage gear ratio, and the controller determines the current gear ratio as the desired stage gear ratio.

* * * * *